March 14, 1961  G. H. KOCH  2,974,984
COUPLING APPARATUS
Filed May 18, 1959
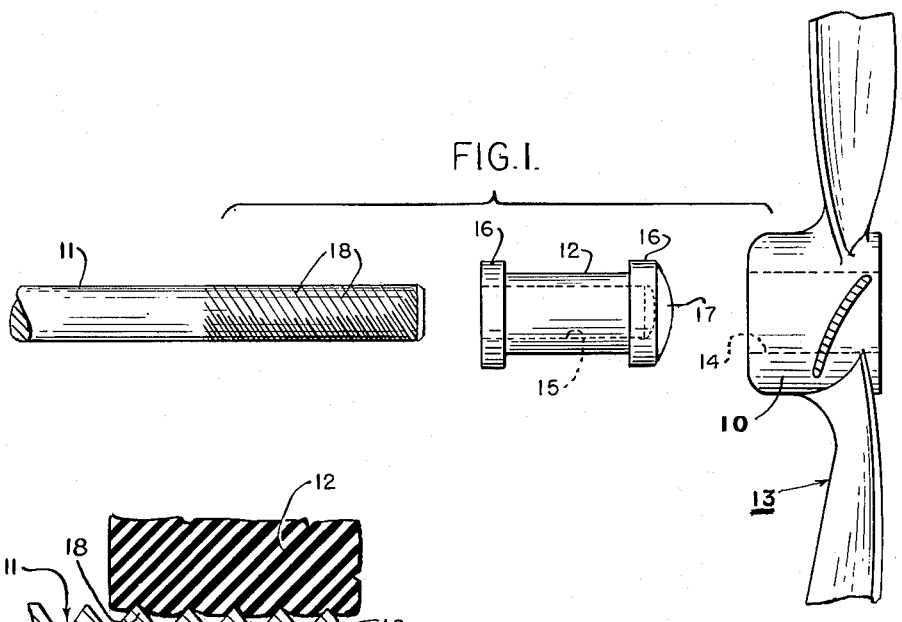
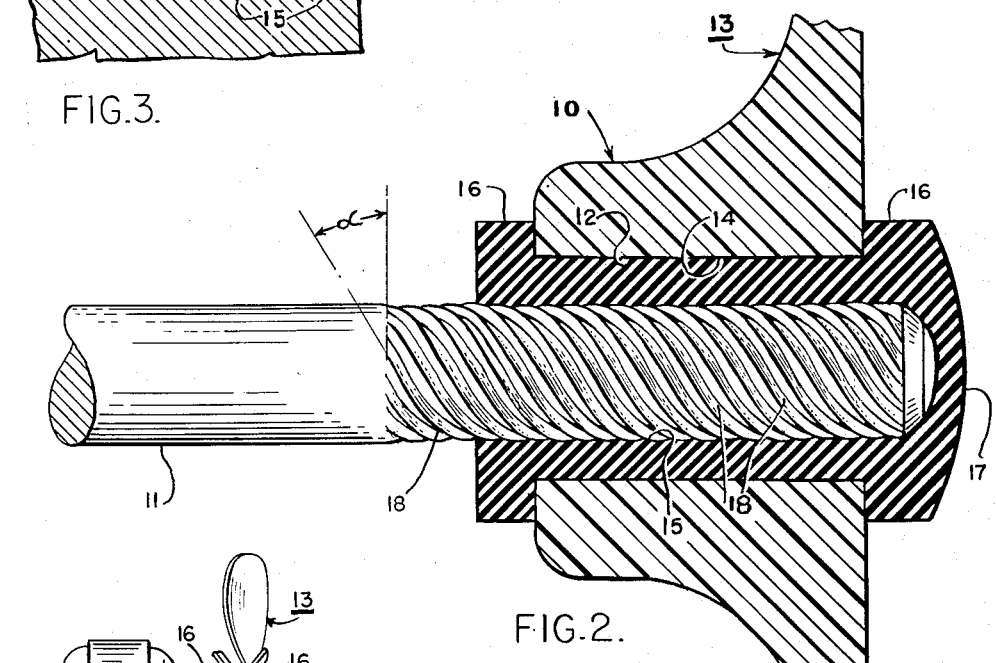
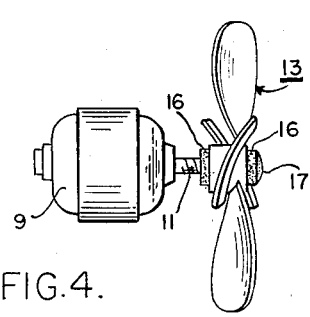
INVENTOR
GUSTAV H. KOCH
BY *William J. Foley*
ATTORNEY

United States Patent Office 2,974,984
Patented Mar. 14, 1961

2,974,984

COUPLING APPARATUS

Gustav H. Koch, Springfield, Mass., assignor to Westinghouse Electric Corporation, East Pittsburgh, Pa., a corporation of Pennsylvania Filed May 18, 1959, Ser. No. 814,080

2 Claims. (Cl. 287—53)

This application is a continuation-in-part of copending application Serial No. 684,772, filed September 18, 1957, and now abandoned.

This invention relates to fan apparatus, more particularly to resilient coupling means suitable for attaching a fan hub to a rotatable drive shaft, and has for an object to provide improved apparatus of this kind.

The use of a resilient tubular sleeve, sandwiched between a motor shaft and a fan hub is well known as a means for coupling a fan hub to a rotatable shaft and for reducing the humming noise usually associated with the operation of domestic fans. Ideally, the resilient coupling means not only reduces noise but is easy to assemble and disassemble, does not slip—either axially or circumferentially on the shaft, and is manufactured at the lowest possible cost. This invention provides resilient coupling means, of the aforementioned type, which is an improvement over prior structures because better results are obtained by a less expensive construction.

Where, as in some prior art structures, the sleeve slips circumferentially on the rotating shaft, a squealing noise that is sometimes more objectionable than the humming noise may be heard. In such cases one method of reducing slippage between the sleeve and the shaft is to increase the wall thickness of the sleeve, so that a tighter fit can be brought about by requiring greater compression of the sleeve; but this only leads to a return of the noise problem, since the effective resilience of the sleeve is lost when it is highly compressed entirely along its length.

Another construction used in prior art structures for preventing circumferential slippage of the sleeve on the shaft is to make a flat portion on the shaft, preferably at its free end, and to shape the inside of the sleeve to follow the contour of the shaft. While this approach to the problem provides a more positive torque connection, a considerable increase in both manufacturing cost and assembly effort is required, and this method is, therefore, something less than ideal.

A still further prior art construction technique for preventing circumferential slippage is the knurling of an annular series of alternating grooves and protuberances on the surface of the shaft, parallel to the axis of rotation. This construction is quite effective in preventing circumferential slippage but is of somewhat limited merit for preventing axial slippage.

As a positive means for preventing axial creeping or slipping of the sleeve along the shaft, it has heretofore been the practice to provide interlocking formations, such as an annular bead and groove, respectively, on the sleeve and shaft. This provision is highly effective in preventing axial slipping movement of the sleeve and is only wanting improvement where ease of assembly and disassembly is a requirement.

In apparatus constructed according to this invention, a driving connection between a hub and shaft is maintained by a resilient tubular sleeve sandwiched in compression therebetween. Distinctly, however, multiple helical threads having a lead angle in the range of between 16° and 48° are formed on the shaft surface by means of an inexpensive rolling or milling operation. The sleeve is compressed for assembly between the shaft and hub whereby the sleeve, which had a smooth cylindrical inner surface in the relaxed state, is deformed to assume generally a threaded surface configuration interdigitating with the shaft threads. These cooperating threads would cause axial movement of the shaft, with respect to the sleeve, in response to relative rotative movement of the sleeve about the shaft, except that a thrust-resisting end wall is integrally formed in the sleeve for limiting axial movement of the shaft. The sleeve is further provided with annular flanges which restrain axial movement of the sleeve with respect to the hub. This arrangement is applied to fans having unidirectional motors for the purpose of reducing operating noise and to provide an inexpensive, non-slip mounting and torque-transmitting means.

Accordingly, it is an object of this invention to provide improved means or resiliently attaching a fan to a rotatable shaft, which means accomplishes the aforesaid purposes.

The foregoing and other objects are effected by the invention as will be apparent from the following description and claims taken in connection with the accompanying drawings, forming a part of this application, in which:

Fig. 1 is an exploded fragmentary side view of parts of a fan constructed and arranged according to the invention;

Fig. 2 is an enlarged sectional view of the assembled parts of Fig. 1;

Fig. 3 is an enlarged fragmentary view of Fig. 2, entirely in section and showing portions of the threaded shaft surface and the surface of the cooperating sleeve in detail; and, Fig. 4 is a reduced side elevational view of the assembled parts of Fig. 2, shown together with a motor.

Referring to the drawings in detail, a tubular or sleeve-like hub member 10 is adapted to be mounted on and driven by a rotatable cylindrical metal shaft 11 which projects from a uni-directional motor 9. Both the hub 10 and shaft 11 are rigidly constructed and would transmit vibrations to each other were it not for the interposition of a tubular sleeve 12, preferably made of resilient material such as rubber, neoprene, and the like.

The hub 10 supports one or more fan blades 13 which can be secured to the hub, but preferably they are integrally formed thereon, as by integrally molding the hub 10 and blades 13 of rigid plastic. A bore 14, through the center of the hub 10, is of an inside diameter larger than the outside diameter of the shaft 11 and equal to or slightly smaller than the outside diameter of the sleeve proper. The sleeve 12 has a blind bore 15 extending axially therein. As will be explained hereinafter in detail, the sleeve 12 is of sufficient wall thickness to require compression between the shaft 11 and the hub 10 upon assembly of the shaft, sleeve and hub, one respectively within the next, as best shown in Figs. 2 and 3.

In the illustrated embodiment, the sleeve 12 has a pair of axially spaced flanges 16 which are formed integrally therewith at opposite ends of the sleeve 12 and extend outwardly therefrom. The flanges 16 define a saddle-like portion in the sleeve 12 by means of which the hub 10 is effectively retained in axial position with respect to the sleeve. An end wall 17, also formed integrally in the sleeve 12, engages the projecting end of the shaft 11 and limits passage of the shaft through the sleeve 12. It should be understood, however, that any partial obstruction in the end of the sleeve, such as a web or annular bead, would serve the same purpose as the wall 17, the function of which is described more fully below.

The surface of the end portion of shaft 11 is provided with multiple helical threads 18 having a lead angle in the range of between 16° and 48°; the lead angle being designated in Fig. 2 by the character "α." The threads may be formed in any suitable manner, as by milling or rolling. The threads 18 have a lead direction away from the end of the shaft when the shaft is rotated in the direction in which it is driven by its motor 9. Upon assembly of the fan, the wall of the sleeve 12 is compressed and resilient threads are formed therein which interdigitate with the threads 18 of the shaft 11, to which end the bore 15 is diametrically sized smaller than the outermost portions of the threads 18 and larger than the innermost or root portions of the threads 18. Stated another way, the wall thickness of the sleeve 12 is greater than the radial clearance between the internal surface of the hub 10 and the outermost portion of the threads 18, and less than the radial clearance between the internal surface of the hub and the innermost portions of the threads 18. Fig. 3 illustrates the cooperating, interdigitating and interlocking formations produced on the inner surface of the sleeve 12 by virtue of assemblying the parts. This surface can be compared with the smooth, cylindrical inner surface of the sleeve 12 before assembly, as shown in Fig. 1.

During operation of the fan, air resistance tends to resist rotation of the bladed hub 10 and to cause counter-revolutionary movement of the hub 10 and sleeve 12 with respect to the shaft 11. In this situation the sleeve 12 is advanced on the shaft 11 until the shaft "bottoms" or engages the end wall 17 of the sleeve 12. Binding of the threads 18 in the sleeve 12 results, and the threads 18 function as protuberances which resist relative movement of the shaft 11 and sleeve 12.

Multiple threads are preferred to a single thread because the former advance the greater distance with each revolution and consequently permit more rapid assembly. Moreover, a multiple thread having a lead angle in the range of between 16° and 48° has been found to be better capable of resisting circumferential slippage because the thread surfaces are disposed at a greater angle than conventional threads with respect to the circumferential forces transmitted to the sleeve by the shaft.

In a commercial application of the present embodiment a ten-inch diameter fan is driven by a 1/30 H.P. motor having a .3605 inch diameter shaft fully threaded at the driving end for 1 5/16 inches with National Course screw threads, there being 12 thread starts, 16 threads per inch, with a lead of .750 inch. Here the lead angle "α" is 36° 53' 48", the outside diameter of the threads is .3586 inch, the pitch diameter is .318 inch, and the sharpness of the threads is .004 inch maximum flatness at the crest, or outer extremity.

Obviously, it is possible to prevent slippage between the hub 10 and sleeve 12 by similarly providing a threaded surface therebetween. However, such a provision is thought to be unnecessary, since the contiguous surfaces of the sleeve 12 and the hub bore 14 are usually in sufficient compression to resist slippage by frictional contact alone, especially since they are on a larger diameter than the interdigitating threaded surfaces and the torque forces operating on them are less than on the contiguous surfaces of the shaft 11 and the sleeve 12.

It may be seen from the foregoing that an economically manufactured, non-slip means for attaching or coupling a fan hub to a shaft, and for transmitting torque therebetween, has been disclosed. Further, the structure is easily assembled and dis-assembled. And because compression is effected intermittently, rather than continuously, along the length of the sleeve, a high degree of resilience is preserved in the sleeve whereby the structure is rendered highly effective for reducing operating noise.

While the invention has been shown in but one form, it will be obvious to those skilled in the art that it is not so limited, but is susceptible of various changes and modifications without departing from the spirit thereof.

What is claimed is:

1. In a fan having a uni-directional motor, improved means for attaching a bladed hub to a motor driven shaft for rotation therewith about the axis of the shaft and for transmitting torque from the shaft to the hub, said attaching means comprising: helical threads formed in said shaft and defining a threaded portion, a cylindrical tubular sleeve of resilient material disposed between the shaft and the hub and having portions thereof compressed between the threaded shaft portion and the hub, said sleeve when compressed having inner surface portions diametrically sized smaller than the outermost portions of adjacent threads and larger than the innermost portions of adjacent threads, axially spaced flanges extending outwardly from said sleeve for retaining said hub in axial position with respect to said sleeve, said helical threads cooperating with the sleeve to bias said shaft in one axial direction with respect to said sleeve when said sleeve tends to revolve relative to said shaft opposite to the direction of shaft revolution, and a thrust-resisting member at one end of said sleeve for limiting movement of said shaft in said one axial direction with respect to said sleeve.

2. A resilient coupling for joining a rigid sleeve-like member to a rigid cylindrical shaft which is disposed coaxially within said member and for uni-directionally transmitting torque between the shaft and the member, said coupling comprising: multiple helical threads having a lead angle in the range of between 16° and 48° formed in said shaft and defining a threaded portion, a cylindrical tubular sleeve of resilient material having an inner surface diametrically sized smaller than the outermost portions of said threads and larger than the innermost portions of said threads, said sleeve being disposed between the shaft and the member and having only portions thereof compressed between the threaded shaft portion and the member so that said sleeve has portions interdigitating with the shaft threads, said helical threads cooperating with the sleeve to bias said shaft in one axial direction with respect to said sleeve when said sleeve tends to revolve relative to said shaft opposite to the direction of shaft revolution, and a thrust-resisting member in said sleeve for limiting movement of said shaft in said one axial direction with respect to said sleeve.

References Cited in the file of this patent

UNITED STATES PATENTS

| | | |
|---|---|---|
| 1,982,363 | Wheeler | Nov. 27, 1934 |
| 2,061,811 | Sinko | Nov. 24, 1936 |
| 2,558,589 | Skolfield | June 26, 1951 |
| 2,713,970 | Kueser | July 26, 1955 |
| 2,818,293 | Klein et al. | Dec. 31, 1957 |